(12) United States Patent
Ganapathy et al.

(10) Patent No.: US 12,127,175 B2
(45) Date of Patent: Oct. 22, 2024

(54) SEAMLESSLY SWITCHING WIRELESS FREQUENCY OF A CONNECTED NETWORK DEVICE USING A MOBILE APPLICATION

(71) Applicant: ARRIS Enterprises LLC, Suwanee, GA (US)

(72) Inventors: Jalagandeswari Ganapathy, Karnataka (IN); Anand Madhav Rao Hallur, Karnataka (IN)

(73) Assignee: ARRIS ENTERPRISES LLC, Horsham, PA (US)

(*) Notice: Subject to any disclaimer, the term of this patent is extended or adjusted under 35 U.S.C. 154(b) by 496 days.

(21) Appl. No.: 17/395,844

(22) Filed: Aug. 6, 2021

(65) Prior Publication Data

US 2022/0046643 A1 Feb. 10, 2022

Related U.S. Application Data

(60) Provisional application No. 63/088,604, filed on Oct. 7, 2020, provisional application No. 63/062,835, filed on Aug. 7, 2020.

(51) Int. Cl.
*H04W 72/04* (2023.01)
*H04W 72/0453* (2023.01)
(Continued)

(52) U.S. Cl.
CPC ....... *H04W 72/0453* (2013.01); *H04W 72/54* (2023.01); *H04W 76/10* (2018.02); *H04W 76/30* (2018.02)

(58) Field of Classification Search
CPC . H04W 72/0453; H04W 76/30; H04W 76/10; H04W 72/54
See application file for complete search history.

(56) References Cited

U.S. PATENT DOCUMENTS

2012/0023538 A1* 1/2012 Hattori .............. H04N 21/6405
2014/0341120 A1* 11/2014 Cordeiro ............. H04W 74/002
(Continued)

FOREIGN PATENT DOCUMENTS

WO 2019/078823 4/2019

OTHER PUBLICATIONS

International Preliminary Report on Patentability dated Feb. 7, 2023 in International (PCT) Application No. PCT/US2021/044931.
(Continued)

*Primary Examiner* — Ronald B Abelson
(74) *Attorney, Agent, or Firm* — Wenderoth, Lind & Ponack, L.L.P.

(57) ABSTRACT

Many network devices initially connect to a network using a wireless frequency band that may not provide the best network performance. A wireless management module can determine that a network device, such as a mobile phone, is connected to the wireless network using an inferior wireless frequency band, for example, the 2.4 GHz wireless frequency band, even though a superior wireless frequency band, for example, the 5 GHz wireless frequency band is available or accessible. Based on a device setting, the wireless management module can automatically switch the mobile network device to the higher frequency wireless frequency band without requiring any user intervention. Additionally, or in the alternative, the wireless management module can prompt the user to allow switching to a different wireless frequency band. Switching to the higher frequency band improves network performance for the network device.

20 Claims, 5 Drawing Sheets

(51) Int. Cl.
  *H04W 72/54*    (2023.01)
  *H04W 76/10*    (2018.01)
  *H04W 76/30*    (2018.01)

(56) References Cited

U.S. PATENT DOCUMENTS

| | | | |
|---|---|---|---|
| 2015/0201416 A1* | 7/2015 | Ode | H04L 5/0007 |
| 2019/0045407 A1* | 2/2019 | Logan | H04W 36/30 |
| 2019/0116504 A1 | 4/2019 | Rusackas et al. | |
| 2019/0312924 A1* | 10/2019 | Bhagavatula | H04L 43/08 |
| 2020/0059929 A1* | 2/2020 | Jones | H04W 72/0473 |
| 2022/0007355 A1* | 1/2022 | Zhu | H04L 5/0053 |

OTHER PUBLICATIONS

International Search Report and the Written Opinion of the International Searching Authority dated Oct. 27, 2021 in International (PCT) Application No. PCT/US2021/044931.

Fabrizio, Simon: "What does WiFi Ban Steering mean?", Mar. 17, 2017 (Mar. 17, 2017), pp. 1-4, XP055852592, Retrieved from the Internet: URL:https://www.broadbandbuyer.com/feature s/3254-what-does-wifi-band-steering-mean/?_ cf_chl_captcha_tk _=pmd_gTyYMG621eqTA0.965Ck9CVessNrpgczUyenoIXcRdY-1634635364-0-gqNtZGzNA1CjonBszQi9 [retrieved on Oct. 19, 2021] the whole document.

\* cited by examiner

SEAMLESSLY SWITCHING WIRELESS FREQUENCY OF A CONNECTED NETWORK DEVICE USING A MOBILE APPLICATION

BACKGROUND

Companies are increasingly providing Multiple Access Point (MAP) architecture or Home Network Controller (HNC) type of home Wi-Fi management, with multiple access point devices and/or extender access point devices within the home to improve Quality of Experience (QoE) of the user for various client devices by offering extended coverage with seamless roaming. Access point devices and extender access point devices communicate with client devices using one or more RF channels.

Generally, network devices or mobile devices in a wireless local network were configured to utilize the 2.4 gigahertz (GHz) wireless frequency. However, with Internet of Things (IoT) technology a multitude of network devices, wireless networks and network users are now connected together. This interconnectivity has led to interferences and conflicts on the wireless network because of high traffic from the various network devices including access points in a congested or dense area. Such interconnectivity impacts the QoE of the user, for example, by affecting the speed of wireless networks due to the large number of network devices operating in the 2.4 GHz wireless frequency band.

The 5 GHz wireless frequency band can offer advantages over the 2.4 GHz wireless frequency band, such as a clearer signal, more non-overlapping channels and higher data throughput rates. However, a 5 GHz wireless frequency band capable mobile network device typically remains connected to the wireless network on the 2.4 GHz wireless frequency band. A user may have a poor QoE as the user expects that the mobile network device will simply roam to the better 5 GHz wireless frequency band once the mobile network device is within range.

Therefore, there is a need to provide improved management of network connectivity by a mobile network device such that the mobile network device automatically switches from an inferior wireless frequency band to a superior or generally better wireless frequency band. That is, the QoE of a user will be enhanced by an improved wireless management of the connectivity of the mobile network device.

SUMMARY

According to aspects of the present disclosure there are provided novel solutions for dynamically or automatically managing network connectivity of a mobile network device in a wireless network environment. For example, a wireless management module or function can determine that a mobile network device is connected to the wireless network using an inferior wireless frequency band, for example, the 2.4 GHz wireless frequency band, even though a superior wireless frequency band, for example, the 5 GHz wireless frequency band is available. In one or more embodiments, the wireless management module can automatically switch the mobile network device to the 5 GHz wireless frequency band without requiring any user intervention. The aspects of the present disclosure provide features that enhance the provisioning and management of access to a network (for example, home/residential network access point devices, wireless extender access point devices (Wi-Fi APs), Home Network Controller devices, wireless routers, mesh networking nodes (e.g., Wi-Fi EasyMesh systems) by a mobile network device so as to provide improved QoE for various users of mobile network devices connected to the network.

An aspect of the present disclosure, a wireless management method for managing connectivity of a client device to a network. The method comprises determining a first wireless frequency band used by the client device to connect to the network, determining a wireless frequency capability associated with the client device, determining that the client device supports a second wireless frequency band that operates at a higher frequency than the first wireless frequency band based, at least in part, on the wireless frequency capability, and switching the client device from the first wireless frequency band to the second wireless frequency band based, at least in part, on the determination that the second wireless frequency band is supported by the client device, and wherein switching the client device from the initial wireless frequency band to the new wireless frequency band comprises disconnecting the client device from the network and reconnecting the client device to the network using the second wireless frequency band.

In an aspect of the present disclosure, the method further comprises that the disconnecting the client device comprises disabling Internet access of the client device and the reconnecting the client device comprises enabling Internet access of the client device.

In an aspect of the present disclosure, the method further comprises monitoring a connectivity of the client device to the network.

In an aspect of the present disclosure, the method further comprises determining that a wireless switching setting is enabled, and wherein the monitoring the connectivity is based, at least in part, on the wireless switching setting.

In an aspect of the present disclosure, the method further comprises that the network load parameter is indicative of a total number of client devices connected to the guest network, and wherein switching the client device from the guest network to the primary network is based, at least in part, on the network load parameter.

In an aspect of the present disclosure, the method further comprises receiving information associated with the client device from a repository, wherein the information is indicative of one or more wireless frequency bands supported by the client device, and switching the client device to a different wireless frequency band of the one or more wireless frequency bands based, at least in part, on a wireless signal strength of the different wireless frequency band.

In an aspect of the present disclosure, the method further comprises scanning the network for network connectivity information associated with one or more network devices, and sending a prompt to a user interface of at least one of the one or more network devices requesting approval to switch the at least one of the one or more network devices from a currently selected wireless frequency band to a different wireless frequency band that operates at a higher frequency than the first wireless frequency band based, at least in part, on the network connectivity information.

In an aspect of the present disclosure, the method further comprises sending a prompt to a user interface of the client device requesting approval to switch the client device from the first wireless frequency band to the second wireless frequency band.

An aspect of the present disclosure provides a wireless management module for managing connectivity of the client device to a network. The wireless management module comprises one or more instructions stored in a non-transitory computer-readable medium of a client device, the one or more instructions, when executed by a processor of the client device, cause the wireless management module to perform one or more operations to determine a first wireless frequency band used by the client device to connect to the network, determine a wireless frequency capability associated with the client device, determine that the client device supports a second wireless frequency band that operates at a higher frequency than the first wireless frequency band based, at least in part, on the wireless frequency capability, and switch the client device from the first wireless frequency band to the second wireless frequency band based, at least in part, on the determination that the second wireless frequency band is supported by the client device, and wherein switching the client device from the initial wireless frequency band to the new wireless frequency band comprises disconnecting the client device from the network and reconnecting the client device to the network using the new wireless frequency band.

In an aspect of the present disclosure, the disconnecting the client device comprises disabling Internet access of the client device and the reconnecting the client device comprises enabling Internet access of the client device.

In an aspect of the present disclosure, the one or more instructions when further executed by the processor of the client device, cause the wireless management module to perform one or more further operations to monitor a connectivity of the client device to the network.

In an aspect of the present disclosure, the one or more instructions when further executed by the processor of the client device, cause the wireless management module to perform one or more further operations to determine that a wireless switching setting is enabled, and wherein the monitoring the connectivity is based, at least in part, on the wireless switching setting.

In an aspect of the present disclosure, the one or more instructions when further executed by the processor of the client device, cause the wireless management module to perform one or more further operations to receive information associated with the client device from a repository, wherein the information is indicative of one or more wireless frequency bands supported by the client device, and switch the client device to a different wireless frequency band of the one or more wireless frequency bands based, at least in part, on a wireless signal strength of the different wireless frequency band.

In an aspect of the present disclosure, the one or more instructions when further executed by the processor of the client device, cause the wireless management module to perform one or more further operations to scan the network for network connectivity information associated with one or more network devices, and send a prompt to a user interface of at least one of the one or more network devices requesting approval to switch the at least one of the one or more network devices from a currently selected wireless frequency band to a different wireless frequency band that operates at a higher frequency than the first wireless frequency band based, at least in part, on the network connectivity information.

In an aspect of the present disclosure, the wireless management module wherein the one or more instructions when further executed by the processor of the client device, cause the wireless management module to perform one or more further operations to send a prompt to a user interface of the client device requesting approval to switch the client device from the first wireless frequency band to the second wireless frequency band.

An aspect of the present disclosure provides a program comprising one or more instructions stored on a non-transitory computer-readable medium, where the program for managing connectivity of a client device to a network. The program when executed by a processor of the client device, causes the client device to perform one or more operations including the steps of the methods described above.

The above-described novel solution may be implemented at any network device, according to one or more example embodiments.

Thus, according to various aspects of the present disclosure described herein, it is possible to provide a dynamic and automatic provisioning and/or management of network access for any number of users of various client devices connected to a network. The novel solution described herein addresses the problem of QoE of a user of a network device that originally connects to the wireless network using an inferior wireless frequency band and maintains that connection even when a superior wireless frequency band is available by automatically (without user intervention) switching the connection of the client device to the superior wireless frequency band based, at least in part, on a range, a signal strength, or both.

BRIEF DESCRIPTION OF DRAWINGS

In the drawings, like reference numbers generally indicate identical, functionally similar, and/or structurally similar elements.

DETAILED DESCRIPTION

Figure 1:
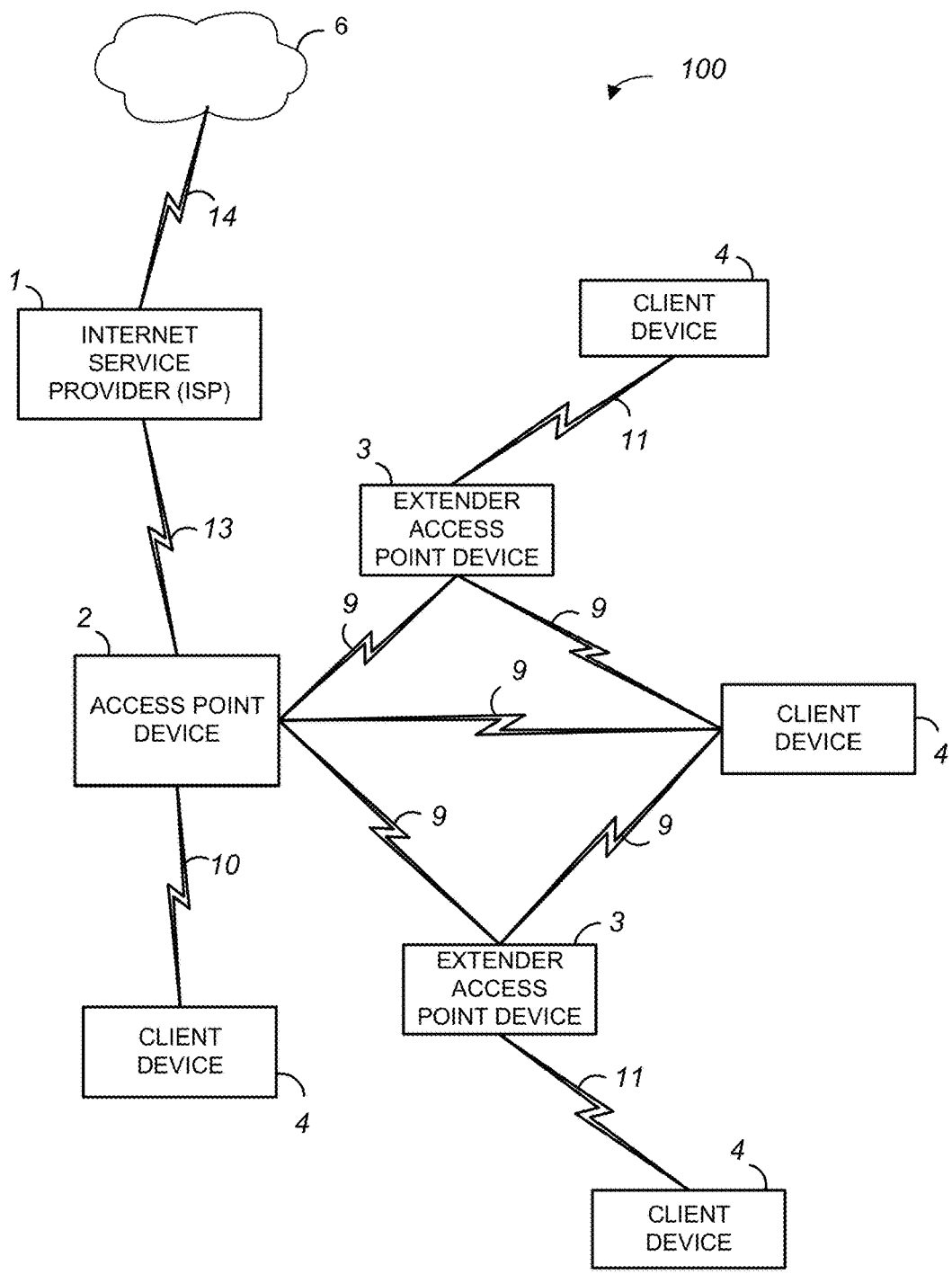
FIG. 1 is a schematic diagram of a network environment, according to one or more aspects of the present disclosure.

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Typically, a network device, for example, a mobile network device such as a mobile phone, connects to a wireless network utilizing the 2.4 GHz wireless frequency band. With the advent of IoT and available network topology configurations, the number of network devices that can connect to a wireless network has increased which has led to interferences and conflicts due to the increase in data traffic from the network devices, for example, access points, extender access points, client devices, etc. Network speed can suffer due to the increased number of network devices that are operating in the 2.4 GHz wireless frequency band.

As an example, in contrast to the 2.4 GHz wireless frequency band, the 5 GHz wireless frequency band offers clear signals and more channels resulting in higher network speeds. While the 5 GHz wireless frequency band operates on a larger spectrum with more nonoverlapping channels, the 5 GHz wireless frequency band has a shorter range for connectivity as compared to other wireless frequency bands, such as the 2.4 GHz wireless frequency band. Generally, higher frequencies are absorbed by environmental objects such as walks, doors, flooring, etc. as compared to lower frequencies and thus have a shorter range and signal strength degrades as the perimeter of the range is approached.

Issues arise when a user expects that a mobile network device will function or operate at a certain performance level. A user may expect that the mobile network device will connect to a 5 GHz network provided by, for example, a multiple-band access point device such as a router or gateway, which offers enhanced network performance once the mobile network device is within range. That is, users generally expect that the mobile network device will roam automatically to the 5 GHz wireless frequency band of the network. However, in spite of the mobile network device being within range of the 5 GHz wireless frequency network, the mobile network device generally remains connected to the 2.4 GHz wireless frequency network even if the mobile network device is capable of connecting to the 5 GHz wireless frequency network. The user may experience poor QoE, issue a complaint, return the mobile network device, provide a poor review/rating, any other type of negative response, or any combination thereof. Such reaction by the user, even though based on inaccurate and/or false assumptions, can impact business including loss of customer loyalty. Therefore, the novel solution provides a wireless management module that manages the connectivity of a mobile network device such that the mobile network device will automatically switch to a superior network, such as the 5 GHz wireless frequency band, when the mobile network device is within range of the 5 GHz wireless frequency band.

While throughout the 2.4 GHz wireless frequency band is discussed as being inferior to the superior 5 GHz wireless frequency band based on one or more network performance parameters, the present disclosure contemplates that any other wireless frequency bands can be inferior and/or superior wireless frequency bands. For example, the 5 GHz wireless frequency band can be considered, in certain circumstances, an inferior wireless frequency band while a 6 GHz wireless frequency band can be considered a superior wireless frequency band. Additionally, signal strength can be considered when switching to a different wireless frequency band. For example, the 5 GHz wireless frequency band can be considered an inferior wireless frequency band when the signal strength has degraded, such as when within proximity of the outer perimeter of the 5 GHz network range.

FIG. 1 is a schematic diagram of a network environment 100, according to one or more aspects of the present disclosure.

It should be appreciated that various example embodiments of inventive concepts disclosed herein are not limited to specific numbers or combinations of devices, and there may be one or multiple of some of the aforementioned electronic apparatuses in the system, which may itself consist of multiple communication networks and various known or future developed wireless connectivity technologies, protocols, devices, and the like.

As shown in FIG. 1, the main elements of the network environment 100 include an access point device 2 connected to the Internet 6 via an Internet Service Provider (ISP) 1 and also connected to different wireless network devices such as one or more wireless extender access point devices 3A and 3B (collectively referred to as extender access point device(s) 3) and one or more client devices 4. The network environment 100 shown in FIG. 1 includes wireless network devices (e.g., extender access point devices 3 and client devices 4) that may be connected in one or more wireless networks (e.g., private, guest, iControl, backhaul network, or Internet of things (IoT) network) within the network environment 100. Additionally, there could be some overlap between wireless network devices (e.g., extender access point devices 3 and client devices 4) in the different networks. That is, one or more network devices could be located in more than one network. For example, the extender access point devices 3 could be located both in a private network for providing content and information to any of client devices 4 and also included in a backhaul network or an iControl network.

Starting from the top of FIG. 1, the ISP 1 can be, for example, a streaming video provider or any computer for connecting the access point device 2 to the Internet 6 for access to an asset. An asset can include, but is not limited to, any of an application, a program, a login, a directory, a file structure, a device setting and/or configuration, data, content (for example, audio content, video content, and/or audio/video content), any other information received from ISP 1, or a combination thereof. The connection 14 between the Internet 6 and the ISP 1 and the connection 13 between the ISP 1 and the access point device 2 can be implemented using a wide area network (WAN), a virtual private network (VPN), a metropolitan area networks (MAN), a system area networks (SAN), a data over cable service interface specification (DOCSIS) network, a fiber optics network (e.g., FTTH (fiber to the home) or FTTX (fiber to the x), or a hybrid fiber-coaxial (HFC)), a digital subscriber line (DSL), a public switched data network (PSDN), a global Telex network, or a 2G, 3G, 4G, 5G, or 6G network, for example.

The connection 13 can further include as some portion thereof a broadband mobile phone network connection, an optical network connection, or other similar connections. For example, the connection 13 can also be implemented using a fixed wireless connection that operates in accordance with, but is not limited to, 3rd Generation Partnership Project (3GPP) Long Term Evolution (LTE), 5G, or 6G protocols. It is also contemplated by the present disclosure that connection 13 is capable of providing connections between the access point device 2 and a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G, 5G or 6G network, for example.

The access point device 2 can be, for example, an access point and/or a hardware electronic device that may be a combination modem and gateway, such as a residential gateway, that combines the functions of a modem, an access point (AP), and/or a router for providing content received from the ISP 1 to network devices (e.g., wireless extender access point devices 3 and client devices 4) in the system 100. It is also contemplated by the present disclosure that the access point device 2 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content. The access point device 2 may also be referred to as a residential gateway, a home network gateway, or a wireless access point (AP). Further, an access point device 2 can be an electronic device that includes an application or software that controls, configures and/or manages access to the network by any client device 4 as described with reference to, for example, FIGS. 2-5. For example, the access point device 2 can be a multi-band router or gateway that provides access to the network via various wireless frequency bands, for example, a 2.4 GHz wireless frequency band network, a 5 GHz wireless frequency band network, any other wireless frequency band, or a combination thereof. In the example illustrated in FIG. 1, client devices 4 can access or connect to access point device 2 directly or indirectly via any extender access point device 3.

The connection 9 between the access point device 2, the wireless extender access point devices 3, and client devices 4 can be implemented using a wireless connection in accordance with any IEEE 802.11 Wi-Fi protocols, Bluetooth protocols, Bluetooth low energy (BLE), or other short range protocols that operate in accordance with a wireless technology standard for exchanging data over short distances using any licensed or unlicensed band such as the citizens broadband radio service (CBRS) band, 2.4 GHz wireless frequency band, 5 GHz wireless frequency bands, 6 GHz wireless frequency band, or 60 GHz wireless frequency band. Additionally, the connection 9 can be implemented using a wireless connection that operates in accordance with, but is not limited to, RF4CE protocol, ZigBee protocol, Z-Wave protocol, or IEEE 802.15.4 protocol. It is also contemplated by the present disclosure that the connection 9 can include connections to a media over coax (MoCA) network. One or more of the connections 9 can also be a wired Ethernet connection. Any one or more of connections 9 can carry information associated with an asset, for example, content received from and/or communicated to ISP 1.

The extender access point devices 3 can be, for example, wireless hardware electronic devices such as access points (APs), extenders, repeaters, etc. used to extend the wireless network by receiving the signals transmitted by the access point device 2 and rebroadcasting the signals to, for example, client devices 4, which may be out of range of the access point device 2. The extender access point devices 3 can also receive signals from the client devices 4 and rebroadcast the signals to the access point device 2, or other client devices 4. Extender access point devices 3 can provide access to the network via, a 2.4 GHz wireless frequency band, a 5 GHz wireless frequency band, any other wireless frequency band, or a combination thereof. While FIG. 1 illustrates a direct connection between extender access point devices 3 and the access point device 2, the present disclosure contemplates an indirect connection as well, for example, via an additional extender access point device 3.

The connections 11 between the extender access point devices 3 and the client devices 4 are implemented through a wireless connection that operates in accordance with any IEEE 802.11 Wi-Fi protocols, Bluetooth protocols, BLE, or other short range protocols that operate in accordance with a wireless technology standard for exchanging data over short distances using any licensed or unlicensed band such as the CBRS band, 2.4 GHz wireless frequency bands, 5 GHz wireless frequency bands, 6 GHz wireless frequency band, or 60 GHz wireless frequency bands. Additionally, the connection 11 can be implemented using a wireless connection that operates in accordance with, but is not limited to, RF4CE protocol, ZigBee protocol, Z-Wave protocol, or IEEE 802.15.4 protocol. Also, one or more of the connections 11 can be a wired Ethernet connection.

The client devices 4 can be, for example, hand-held computing devices, personal computers including, but not limited to, any of a desktop computer or a laptop, an electronic tablet, a mobile phone, a smart phone, a smart speaker, an IoT device, an iControl device, a portable music player with smart capabilities capable of connecting to the Internet, a cellular network, and/or interconnecting with other devices via Wi-Fi and/or Bluetooth, other wireless hand-held consumer electronic devices capable of executing and displaying information received through the access point device 2, any other type of mobile wireless network device, or any combination thereof. The client devices 4 can include a wireless management module that automatically switches the client device 4 from a connection to the network on an inferior wireless frequency band to a connection on a superior wireless frequency band, for example, from a 2.4 GHz wireless frequency band to a 5 GHz wireless frequency band, when the client device 4 is within range of the superior wireless frequency band.

The connection 10 between the access point device 2 and the client device 4 can be implemented through a wireless connection that operates in accordance with, but is not limited to, any IEEE 802.11 protocols. Additionally, the connection 10 between the access point device 2 and the client device 4 can also be implemented through a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G or 5G network, for example.

The connection 10 can also be implemented using a wireless connection in accordance with Bluetooth protocols, BLE, or other short range protocols that operate in accordance with a wireless technology standard for exchanging data over short distances using any licensed or unlicensed band such as the CBRS band, 2.4 GHz wireless frequency band, 5 GHz wireless frequency band, 6 GHz wireless frequency band or 60 GHz wireless frequency band. One or more of the connections 10 can also be a wired Ethernet connection.

Figure 2:
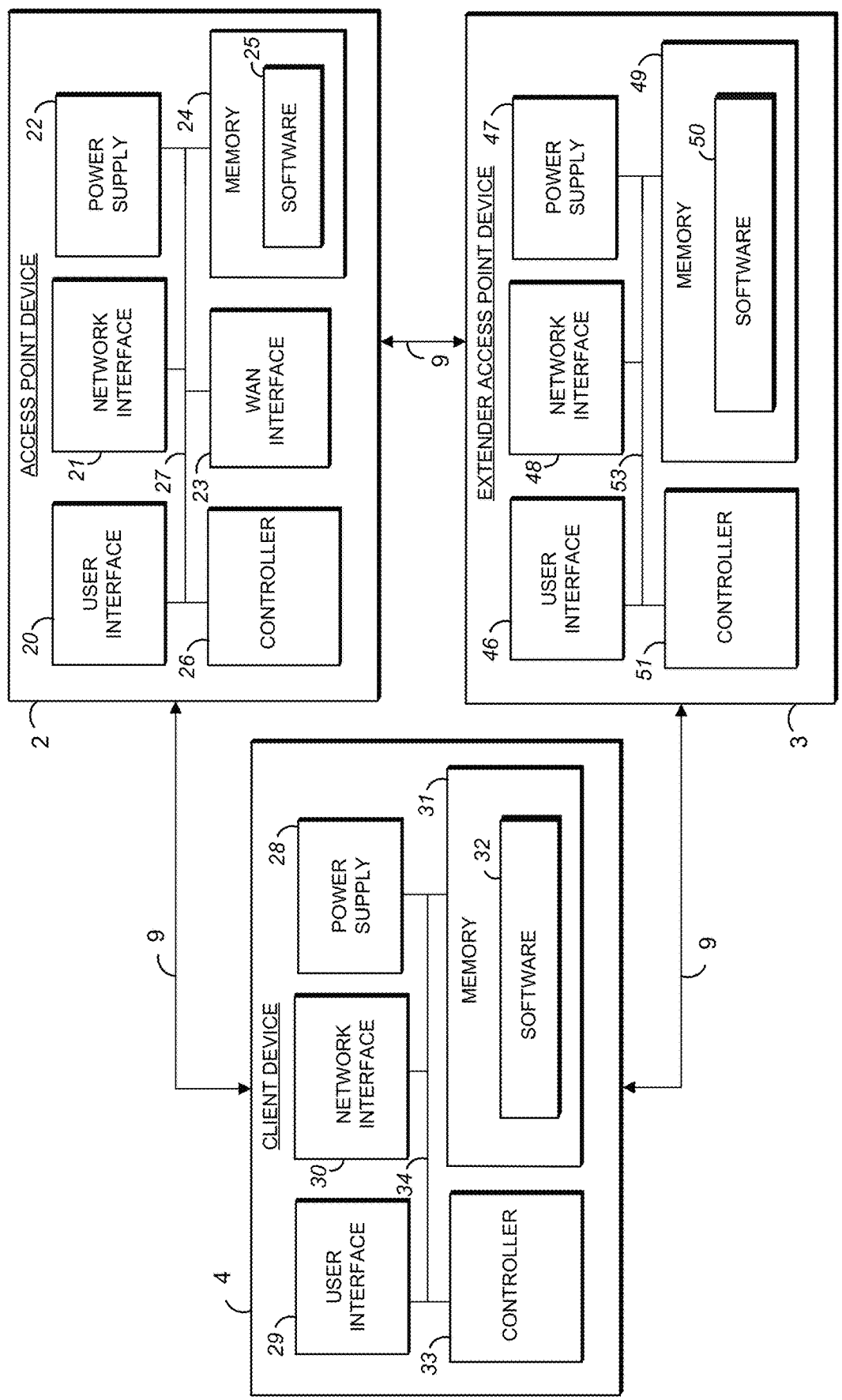
FIG. 2 is a more detailed block diagram illustrating various components of an exemplary access point device, client device, and extender access point device implemented in the system of FIG. 1, according to one or more aspects of the present disclosure.

A detailed description of the exemplary internal components of the access point device 2, the extender access point devices 3, and the client devices 4 shown in FIG. 1 will be provided in the discussion of FIG. 2. However, in general, it is contemplated by the present disclosure that the access point device 2, the extender access point devices 3, and the client devices 4 include electronic components or electronic computing devices operable to receive, transmit, process, store, and/or manage data and information associated with the network environment 100, which encompasses any suitable processing device adapted to perform computing tasks consistent with the execution of computer-readable instructions stored in a memory or a computer-readable recording medium (e.g., a non-transitory computer-readable medium).

Further, any, all, or some of the computing components in the access point device 2, the extender access point devices 3, and the client devices 4 may be adapted to execute any operating system, including Linux, UNIX, Windows, MacOS, DOS, and ChromOS as well as virtual machines adapted to virtualize execution of a particular operating system, including customized and proprietary operating systems. The access point device 2, the extender access point devices 3, and the client devices 4 are further equipped with components to facilitate communication with other computing devices over the one or more network connections to local and wide area networks, wireless and wired networks, public and private networks, and any other communication network enabling communication in the network environment 100.

FIG. 2 is a more detailed block diagram illustrating various components of an exemplary access point device 2, client device 4, and wireless extender access point device 3 implemented in the system of FIG. 1, according to one or more aspects of the present disclosure.

Although FIG. 2 only shows one extender access point device 3 and one client device 4, the extender access point device 3 and the client device 4 shown in the figure are meant to be representative of the other extender access point devices 3 and client devices 4 of a network system, for example, network environment 100 shown in FIGS. 1-4. Similarly, the connections 9 between the access point device 2, the extender access point device 3, and the client device 4 shown in FIG. 2 are meant to be exemplary connections and are not meant to indicate all possible connections between the access point devices 2, extender access point devices 3, and client devices 4. Additionally, it is contemplated by the present disclosure that the number of access point devices 2, extender access point devices 3, and client devices 4 is not limited to the number of access point devices 2, extender access point devices 3, and client devices 4 shown in FIGS. 1-4.

Now referring to FIG. 2 (e.g., from left to right), the client device 4 can be, for example, any wireless network device as discussed with reference to FIG. 1, including, but not limited to, a computer, a portable device, an electronic tablet, an e-reader, a PDA, a mobile phone such as a smart phone, a smart speaker, an IoT device, an iControl device, a portable music player with smart capabilities capable of connecting to the Internet, cellular networks, and interconnecting with other devices via Wi-Fi and Bluetooth, other wireless hand-held consumer electronic device capable of executing and displaying the content received through the access point device 2, any other mobile network device, or a combination thereof.

As shown in FIG. 2, the client device 4 includes a power supply 28, a user interface 29, a network interface 30, a memory 31, and a controller 33.

The power supply 28 supplies power to the internal components of the client device 4 through the internal bus 34. The power supply 28 can be a self-contained power source such as a battery pack with an interface to be powered through an electrical charger connected to an outlet (e.g., either directly or by way of another device). The power supply 28 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The user interface 29 includes, but is not limited to, any of a biometric scanning device, push buttons, a camera, a keyboard, a keypad, a liquid crystal display (LCD), a thin film transistor (TFT), a light-emitting diode (LED), a high definition (HD) or other similar display device including a display device having touch screen capabilities so as to allow interaction between one or more users and the client device 4, or a combination thereof. For example, the client device 4 may include software 32 stored in a memory 31, such as a network management module, that provides a user interface 29 to a user for initiating or interacting with the software 32. In one or more embodiments, the user interface 29 may be external to the client device 4. In one or more embodiments the user interface 29 can include a display device for displaying a prompt or message from the network management module.

The network interface 30 can include, but is not limited to, various network cards, interfaces, and circuitry implemented in software and/or hardware to enable communications with the access point device 2 and the extender access point device 3 using the communication protocols in accordance with connection 9 (e.g., as described with reference to FIG. 1). For example, the network interface card 30 allows for communication between the client device 4 and the access point device 2. As shown, network interface card 30 allows for direct communication with access point device 2 and indirect communication with access point device 2 via expander access point device 3.

The memory 31 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 31 can be used to store any type of instructions, software, or algorithms including software 32, for example, a wireless management module for managing the connectivity of the client device 4 to the wireless network, in accordance with the embodiments described in the present disclosure. In one or more embodiments, client device 4 is an electronic device shared between multiple users, and software 32 includes one or more applications and/or instructions for establishing a connection with the access point device 2 and the extender access point device 3 so as to access ISP 1 and for managing connectivity by determining and/or switching to a superior wireless frequency band.

The controller 33 controls the general operations of the client device 4 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software including the software 32 for controlling the operation and functions of the client device 4 in accordance with the embodiments described in the present disclosure. Communication between the components (e.g., 28-31 and 33) of the client device 4 may be established using an internal bus 34.

The extender access point device 3 can be, for example, any wireless hardware electronic device used to extend a wireless network by receiving the signals transmitted by the access point device 2 and rebroadcasting the signals to one or more client devices 4, which may be out of range of the access point device 2 including, but not limited to, a wireless extender, a repeater, and/or an access point. The extender access point device 3 can also receive signals from any one or more of the client devices 4 and rebroadcast the signals to the access point device 2, mobile device 5, or any other one or more client devices 4.

As shown in FIG. 2, the extender access point device 3 includes a user interface 46, a power supply 47, a network interface 48, a memory 49, and a controller 51.

The user interface 46 can include, but is not limited to, one or more push buttons, a keyboard, a keypad, an LCD, a TFT, an LED, an HD or other similar display device including a display device having touch screen capabilities so as to allow interaction between a user and the extender access point device 3.

The power supply 47 supplies power to the internal components of the wireless extender access point device 3 through the internal bus 53. The power supply 47 can be connected to an electrical outlet (e.g., either directly or by way of another device) via a cable or wire.

The network interface 48 can include various network cards, interfaces, and circuitry implemented in software and/or hardware to enable communications with the client device 4 and the access point device 2 using the communication protocols in accordance with connection 9 (e.g., as described with reference to FIG. 1). For example, the network interface 48 can include multiple radios or sets of radios (e.g., a 2.4 GHz radio, one or more 5 GHz radios, and/or a 6 GHz radio), which may also be referred to as wireless local area network (WLAN) interfaces. One radio or set of radios (e.g., 5 GHz and/or 6 GHz radio(s)) provides a backhaul connection between the wireless extender access point device 3 and the access point device 2, and optionally other wireless extender access point device(s) 3. Another radio or set of radios (e.g., 2.4 GHz, 5 GHz, and/or 6 GHz radio(s)) provides a fronthaul connection between the extender access point device 3 and one or more client device(s) 4.

The memory 49 can include a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk or any other various layers of memory hierarchy. The memory 49 can be used to store any type of instructions, software, or algorithm including software 50 associated with controlling the general functions and operations of the wireless extender access point device 3 in accordance with the embodiments described in the present disclosure.

The controller 51 controls the general operations of the wireless extender access point device 3 and can include, but is not limited to, a CPU, a hardware microprocessor, a hardware processor, a multi-core processor, a single core processor, an FPGA, a microcontroller, an ASIC, a DSP, or other similar processing device capable of executing any type of instructions, algorithms, or software for controlling the operation and functions of the wireless extender access point device 3 in accordance with the embodiments described in the present disclosure. General communication between the components (e.g., 46-49 and 51) of the extender access point device 3 may be established using the internal bus 53.

The access point device 2 can be, for example, a hardware electronic device that can combine one or more functions of any of a modem, a gateway (for example, a residential gateway), an access point (AP), a router, or combinations thereof for providing an asset received from the asset provider via (ISP) 1 to network or wireless devices (e.g., extender access point devices 3, client devices 4) in the system, for example, system 100 of FIG. 1. It is also contemplated by the present disclosure that the access point device 2 can include the function of, but is not limited to, an IP/QAM STB or SMD that is capable of decoding audio/video content, and playing OTT or MSO provided content.

As shown in FIG. 2, the access point device 2 includes a user interface 20, a network interface 21, a power supply 22, a wide area network (WAN) interface 23, a memory 24, and a controller 26.

The user interface 20 can include, but is not limited to, push buttons, a keyboard, a keypad, an LCD, a TFT, an LED, an HD or other similar display device including a display device having touch screen capabilities so as to allow interaction between a user and the access point device 2.

The network interface 21 may include various network cards, and circuitry implemented in software and/or hardware to enable communications with the extender access point device 3 and the client device 4 using the communication protocols in accordance with connection 9 (e.g., as described with reference to FIG. 1). Additionally, the various network cards, interfaces, and circuitry of the network interface 21 enable communications with a client device 4 (e.g., a mobile device) using the one or more communication protocols in accordance with connection 10 (e.g., as described with reference to FIG. 1). For example, the network interface 21 can include an Ethernet port (also referred to as a LAN interface) and multiple radios or sets of radios (e.g., a 2.4 GHz radio, one or more 5 GHz radios, and/or a 6 GHz radio, also referred to as WLAN interfaces). One radio or set of radios (e.g., 5 GHz and/or 6 GHz radio(s)) provides a backhaul connection between the access point device 2 and the wireless extender access point device(s) 3. Another radio or set of radios (e.g., 2.4 GHz, 5 GHz, and/or 6 GHz radio(s)) provides a fronthaul connection between the access point device 2 and one or more client devices 4.

The power supply 22 supplies power to the internal components of the access point device 2 through the internal bus 27. The power supply 22 can be connected to an electrical outlet (e.g., either directly or by way of another device) via a cable or wire. The wide area network (WAN) interface 23 may include various network cards, and circuitry implemented in software and/or hardware to enable communications between the access point device 2 and the ISP 1 using the wired and/or wireless protocols in accordance with connection 13 (e.g., as described with reference to FIG. 1).

The memory 24 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 24 can be a non-transitory computer-readable storage medium used to store any type of instructions, software, or algorithm including software 25 for controlling the general functions and operations of the access point device 2 and performing management functions related to the other devices (wireless extender access point devices 3 and client devices 4) in the network in accordance with the embodiments described in the present disclosure (e.g., including a dynamic switching of one or more client devices 4 from a first wireless frequency band to a second wireless frequency band, according to some example embodiments of the present disclosure).

The controller 26 controls the general operations of the access point device 2 as well as performs management functions related to the other devices (wireless extender access point devices 3 and client device 4) in the network. The controller 26 can include, but is not limited to, a central processing unit (CPU), a network controller, a hardware microprocessor, a hardware processor, a multi-core processor, a single core processor, a FPGA, a microcontroller, an ASIC, a DSP, or other similar processing device capable of executing any type of instructions, algorithms, or software including the software 25 for controlling the operation and functions of the access point device 2 in accordance with the embodiments described in the present disclosure including, but not limited to, an access control function to control access to one or more assets by the client device 4. Communication between the components (e.g., 20-26) of the access point device 2 may be established using the internal bus 27. The controller 26 may also be referred to as a processor.

The software 25 can comprise one or more computer-readable instructions that cause the access point device to provide access or provision one or more client devices 4 so as to control the level of access of the one or more client devices 4 to the network. A network can comprise a first wireless frequency band network (a 2.4 GHz network) and a second wireless frequency band network (a 5 GHz network) where each has one or more network features and where connectivity to each can be automatically controlled by the wireless management module or software 32 of client device 4. For example, client device 4 can initially connect to the 2.4 GHz network (connect to the network on the 2.4 GHz wireless frequency band) and then be automatically switched to the 5 GHz network (switched to the 5 GHz wireless frequency band).

Figure 3:
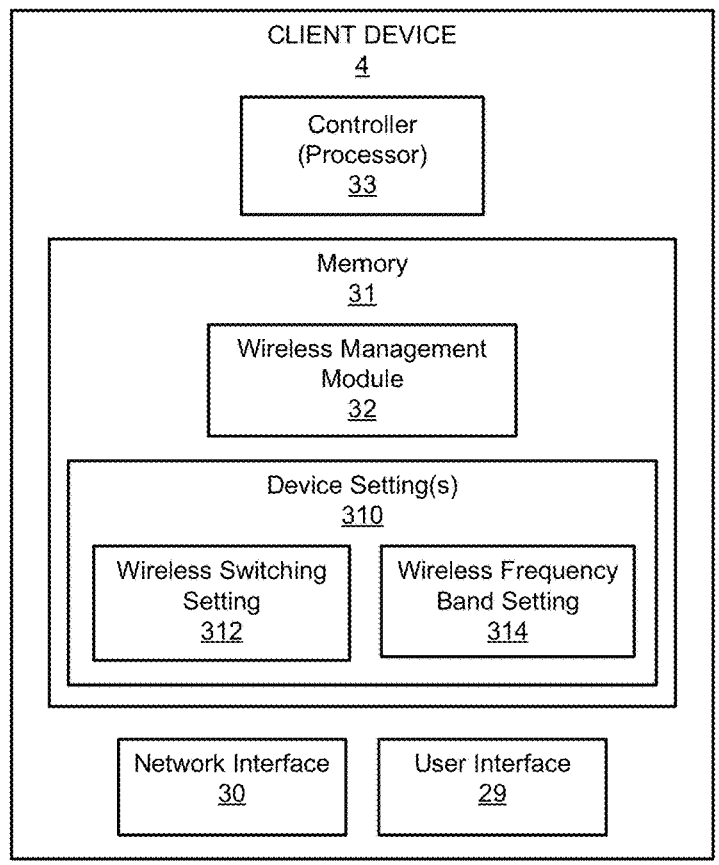
FIG. 3 illustrates a wireless management module of a client device, according to one or more aspects of the present disclosure.

FIG. 3 illustrates a wireless management module of a client device 4, according to one or more aspects of the present disclosure. While FIG. 3 illustrates a single client device 4, the present disclosure contemplates any number of client devices 4.

FIG. 3 illustrates a client device 4, such as a mobile wireless network device, that includes all the components/elements of client device 4 discussed with reference to FIG. 2. As shown, a client device 4 can include a software 32, referred to as a wireless management module 32, stored in memory 31. The wireless management module 32 can comprise one or more computer-readable instructions that, when executed by a processor 33, cause the client device 4 to automatically switch the client device 4 from a first wireless frequency band to a second wireless frequency band to improve the network performance of the client device 4, for example, as discussed with respect to FIG. 4.

The wireless management module 32 can access or utilize one or more device settings 310. The one or more device settings 310 can be stored in memory 31, as part of a BIOS setting, any other storage medium, or a combination thereof. In one or more embodiments, the one or more device settings 310 can include a wireless switching setting 312, a wireless frequency band setting 314, any other setting, or a combination thereof. A wireless switching setting 312 can indicate whether the client device 4 is enabled to allow automatic switching from a first wireless frequency band (for example, an inferior wireless frequency band, such as a 2.4 GHz wireless frequency band) to a second wireless frequency band (for example, a superior wireless frequency band, such as a 5 GHz wireless frequency band). For example, the wireless switching setting 312 can be a binary value, such as a "1" indicative of a wireless switching setting set to enabled or a "0" indicative of a wireless switching setting 312 set to disabled. The present disclosure contemplates any value and/or representation for the wireless switching setting 312. The wireless frequency band setting 314 can indicate one or more wireless frequency bands that the client device 4 can be switched to, for example, a 5 GHz wireless frequency band, the one or more wireless frequency bands supported by the client device 4, for example, a 2.4 GHz wireless frequency band and a 5 GHz wireless frequency band, or any other indication of a wireless frequency band supported by the client device 4.

In one or more embodiments, user interface 29 can provide an interface, such as a graphical user interface (GUI), to a user of the client device 4 for selecting, altering, and/or inputting one or more device settings 310. For example, the user interface 29 can allow a user to enable or disable the wireless switching setting 312 of the one or more device settings 310. As another example, the user interface 29 can allow a user to enter for the wireless frequency band setting 314 of the one or more device settings 310 one or more wireless frequency bands supported by the client device 4.

Figure 4:
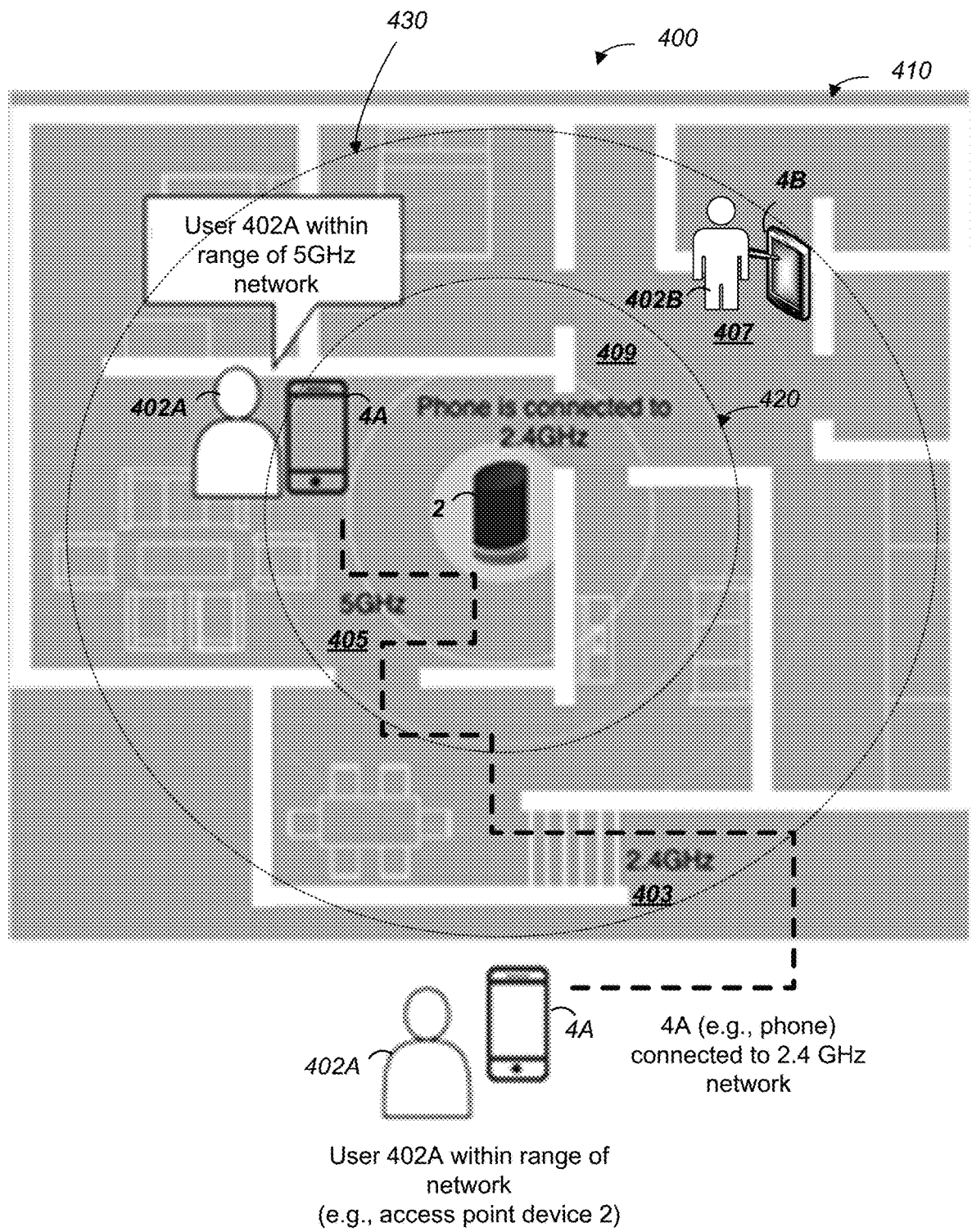
FIG. 4 illustrates a network environment where a client device can be automatically switched to a different wireless frequency band, according to one or more aspects of the present disclosure.

FIG. 4 illustrates a network environment 400 where a client device 4 can be automatically switched to a different wireless frequency band, according to one or more aspects of the present disclosure. Network environment 400 can be similar to network environment 100 of FIG. 1, for example, network environment 400 can include one or more similar network devices as discussed with reference to FIG. 1.

FIG. 4 illustrates a user 402A of a client device 4A. Client device 4A can be a mobile phone, for example, that is capable of connecting to a wireless network via access point device 2. Initially, the user 402A is at a first location 403 of the network environment 400 as shown at the bottom of FIG. 4. When the client device 4A associated with user 402A comes within range 430 of the network provided by access point device 2 at the first location 403, the client device 4A can only connect to a first wireless frequency band, for example, the 2.4 GHz wireless frequency band. As illustrated in FIG. 4, when user 402A enters the premises 410 (for example, a home or office) at the first location 403, the client device 4A connects to the network provided by access point device 2 using the 2.4 GHz wireless frequency band as the client device 4A is not within a range 420 of the access point device 2 making another wireless frequency band inaccessible, such as the 5 GHz wireless frequency band.

As the user 402A traverses the premises 410 to a second location 405, the client device 4A is within a range 420 of the access point device 2 such that a second wireless frequency band at a higher frequency than the first wireless frequency band is accessible, for example, an additional or different wireless frequency band is accessible, such as the 5 GHz wireless frequency band. If the client device 4A includes a wireless management module 32, the wireless management module 32 can detect that the client device 4A is within range 420 of the 5 GHz wireless frequency band and can perform one or more operations such as initiating, by the wireless management module 32, an automatic wireless frequency band switch, sending a notification to a user 402A of the client device 4a, or any other network management operation In one or more embodiments, the switching of wireless frequency bands can occur without any user intervention. For example, the wireless management module 32 can automatically switch the connection of the client device 4A to the network from the first or initial wireless frequency band, here the 2.4 GHz wireless frequency band, to the newly accessible or different wireless frequency band, here the 5 GHz wireless frequency band based, at least in part, on the one or more device settings 310, for example, a wireless switching setting 312 set to enabled. The wireless management module 32 can determine that the wireless switching setting 312 is enabled. For example, the user 402A or other administrator can set the wireless switching setting 312 via a user interface 29 of the client device 4A. In one or more embodiments, the wireless management module 32 queries a repository for the wireless switching setting 312, for example, a repository stored locally to the client device 4A, such as in memory 31, or remotely from the client device 4A, such as a repository located at the access point device 2 or accessible via the ISP 1, such as an Internet 6. In one or more embodiments, if the wireless switching setting 312 is enabled, the wireless management module 32 switches the connection from the first or initial wireless frequency band (for example, the 2.4 GHz wireless frequency band) to the second wireless frequency band (for example, the 5 GHz wireless frequency band) by first disabling Internet access (such as disabling a Wi-Fi setting of the client device 4) or disconnecting the client device 4 from the network at the first wireless frequency band and enabling Internet access (such as enabling the Wi-Fi setting of the client device 4) or reconnecting the client device 4 to the network at the second wireless frequency band. By disabling and then enabling the Internet access, the client device 4A will automatically select the 5 GHz wireless frequency band. In general, a user does not notice or perceive any interruption in service due to the disconnecting/reconnecting sequence.

Figure 5:
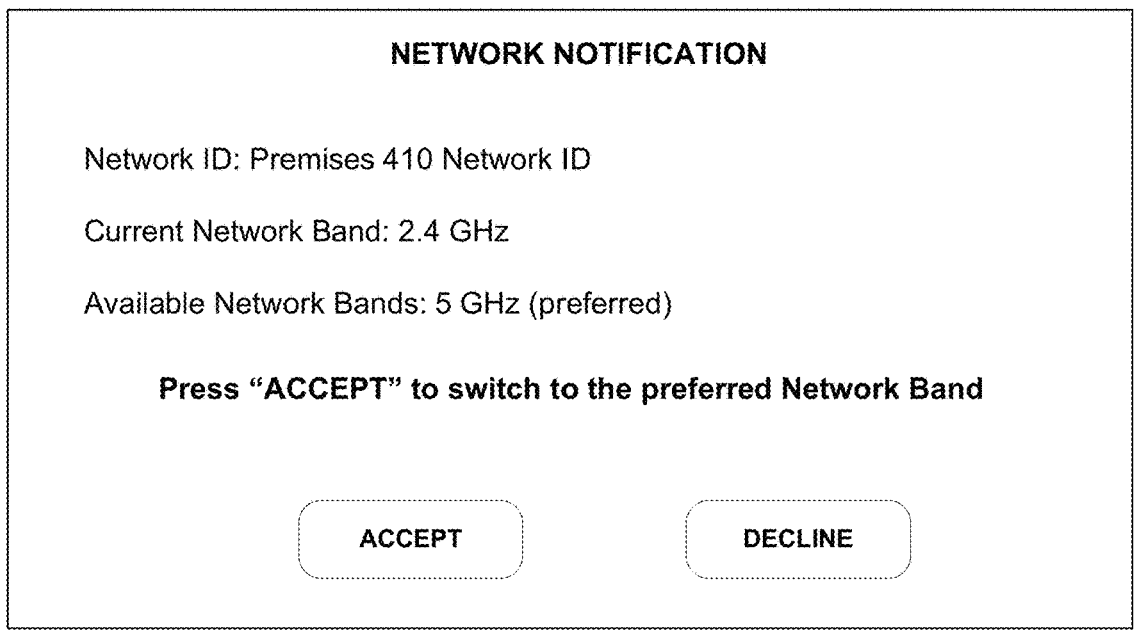
FIG. 5 illustrates a network notification to switch a client device to a different wireless frequency band, according to one or more aspects of the present invention.

In one or more embodiments, the wireless management module 32 can send a prompt to the user interface 29 of the client device 4A that notifies the user 402A that an additional or different wireless frequency band is accessible that can provide better performance than the first wireless frequency band. For example, FIG. 5 illustrates a network notification 502 presented at a user interface 29 of the client device 4A. The network notification 502 informs the user 402A that a different network connection is available, such as a 5 GHz wireless frequency band. In one or more embodiments, the network notification 502 can comprise any other information associated with the network and/or the client device 4A. The prompt can also present the user with one or more inputs for selection, such as an "ACCEPT" button and/or a "DECLINE" button. The present disclosure contemplates that the network notification 502 can take any user interface form and present any information or response request suitable for providing the user 402A with notice that the client device 4A is within range of a different wireless frequency band, for example, within range 420. If the user 402A chooses to proceed with switching wireless frequency bands, for example, affirms or approves the switch by selecting the "ACCEPT" button, the wireless management module 32 can switch the connection of client device 4A from the initial wireless frequency band (for example, the 2.4 GHz wireless frequency band) to the suggested or preferred wireless frequency band (for example, the 5 GHz wireless frequency band). Whether automatically or by providing a prompt, the QoE and/or quality of service (QoS) of a user 402A is enhanced by switching the client device 4A to the better performing network, such as the 5 GHz wireless frequency band.

In one or more embodiments, the wireless management module 32 of client device 4A can scan the network for one or more other network devices connected to the network via access point device 2, for example, for network connectivity information associated with the one or more other network devices. Such network connectivity information can be obtained via one or more access modes. For example, access point device 2 can receive a query or request from client device 4A and in response can send network connectivity information associated with one or more network devices connected to the network, such as client device 4B associated with user 402B located at a third location 407 of the premises 410. As another example, the client device 4A can communicate with client device 4B via a network connection to determine network connectivity information associated with the client device 4B. In one or more embodiments, client device 4A and client device 4B communicate with each other via a network resource or a cloud repository. For example, Internet 6 can be a network resource or a cloud repository. In one or more embodiments, the client device 4B is also running a wireless management module 32 such that client device 4B and client device 4A can communicate with each other via each respective management module 32. In one or more embodiments, client device 4A communicates via a short message service (SMS) or any other protocol.

The network connectivity information associated with client device 4B can include, but is not limited to, any of one or more device settings 310 associated with client device 4B, a currently selected wireless frequency band (such as information that indicates that client device 4B is connected to the network using the 2.4 GHz wireless frequency band), one or more supported wireless frequency bands (such as the capability of client device 4b to access different wireless frequency bands, for example, the 5 GHz wireless frequency band), a device type, any other device specific or network connectivity information, or a combination thereof. The wireless management module 32 of client device 4A can initiate a switch at client device 4B from a connection to the 2.4 GHz wireless frequency band to the 5 GHz frequency based, at least in part, on the information received from the scan. For example, the client device 4A can send a notification to client device 4B when client device 4B comes within range 420 of the access point device 2, such as when user 402B transitions from the third location 407 to the fourth location 409. The notification can be a short message service (SMS) message, any other message using a supported protocol or messaging application, or a combination thereof. The notification can be similar to that of network notification 502 of FIG. 5. In another example, the client device 4A can initiate an automatic transfer or switch at client device 4B to the 5 GHz wireless frequency band based on the one or more device settings 310 of client device 4B. In this way, the wireless management module 32 can switch connectivity of a network device from a wireless network frequency band that may not provide sufficient network performance to a wireless network frequency band that operates at a higher frequency so as to provide better network performance and QoE for the user.

In one or more embodiments, the user 402A associated with the client device 4A can traverse from the second location 405 towards the first location 403. While traversing the premises 410 starting at the second location 405, the client device 4A is within range 420 but as the client device 4A approaches the outer perimeter of range 420 the wireless signal strength associated with the 5 GHz wireless frequency band can decrease such that the 2.4 GHz wireless frequency band has a greater wireless signal strength. At a certain point, the advantages of the connection to the 5 GHz wireless frequency band are outweighed by the lower wireless signal strength of the 5 GHz wireless frequency band. In one or more embodiments, once the ratio or difference between the two wireless signal strengths reach and/or exceed a threshold the wireless management module 32 can switch the client device 4A to the 2.4 GHz wireless frequency band that has the greater wireless signal strength. In this way, the wireless management module 32 can switch between wireless frequency bands based, at least in part, on wireless signal strength, a range, or both.

Figure 6:
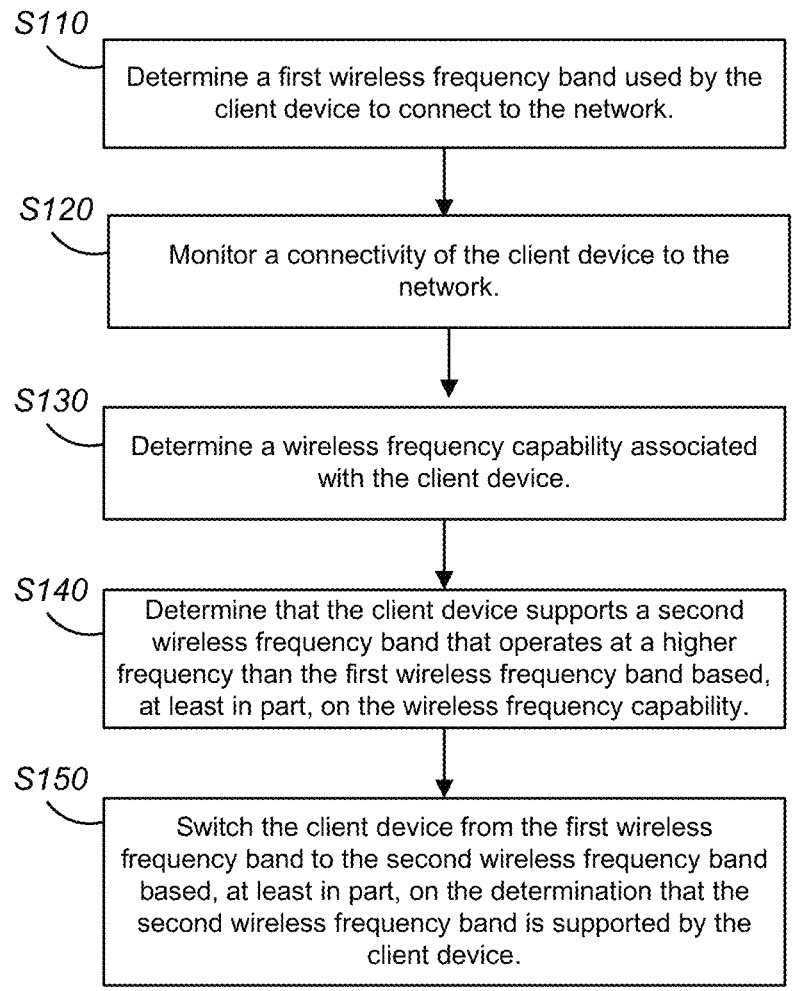
FIG. 6 is a flow chart illustrating a method for switching a client device to a different wireless frequency band, according to one or more aspects of the present disclosure.

FIG. 6 is a flow chart illustrating a method for providing switching a client device to a different wireless frequency band, according to one or more aspects of the present disclosure.

A client device 4, for example, of a network environment 100, may be programmed with one or more instructions (e.g., a wireless management module 32 stored in memory 31) to perform one or more operations in one or more example embodiments. In FIG. 6, it is assumed that the devices and/or elements include their respective controllers and their respective software stored in their respective memories, as discussed above in connection with FIGS. 1-5 which when executed by their respective controllers perform the functions and operations in accordance with one or more aspects of the present disclosure.

The client device 4 comprises a controller 33 that executes one or more computer-readable instructions, stored on a memory 31, that when executed perform or cause the client device 4 to perform one or more of the operations of steps S110-S150. In one or more embodiments, the one or more instructions can be one or more software or applications, for example, a wireless management function 32. While the steps S110-S150 are presented in a certain order, the present disclosure contemplates that any one or more steps can be performed simultaneously, substantially simultaneously, repeatedly, in any order or not at all (omitted).

Business network environments, home network environments, and public network environments, can include a network that comprises multiple wireless frequency bands. For example, an access point device 2 can provide a first network (for example, a network operating at the 2.4 GHz wireless frequency band) and a second network (for example, a network operating at the 5 GHz wireless frequency band). Any one or more network devices within range of the access point device 2, for example, a client device 4, can connect to the first network or the second network. A user of a client device 4 can install an application (for example, wireless management module 32) on the client device 4 that communicates with the access point device 2 (for example, a router or a gateway). The application allows the client device 4 to automatically or seamlessly switch the client device 4 from the first network to the second network based, at least in part, one or more device settings 310 so as to improve the QoE/QoS for the user.

At step S110, a wireless management function of the client device 4 determines the initial or a first wireless frequency band used by the client device 4 to connect to the network, for example, to a network provided access point device 2. Access can be provided to the network on a plurality of wireless frequency bands, for example, a 2.4 GHz wireless frequency band and a 5 GHz wireless frequency band. Initially, a client device 4A may only be within range of the 2.4 GHz wireless frequency band or may by default connect to the 2.4 GHz wireless frequency band. The 2.4 GHz wireless frequency band or any lower wireless frequency band is generally inferior to higher wireless frequency bands as the 2.4 GHz band is crowded, provides lower data rates, etc. and may not provide the best network performance. In contrast, higher wireless frequency bands, such as the 5 GHz wireless frequency band, provide a superior network performance including a clearer signal, more non-overlapping channels, and/or higher data rates. However, the higher wireless frequency bands have a shorter range. Thus, it is common for a client device 4 to connect to the lower wireless frequency band (the 2.4 GHz wireless frequency band) initially as other wireless frequency bands may not be accessible as discussed with reference to FIG. 4. At step 110, for example, the wireless management module 32 can determine that the client device 4 is connected to the network via at an initial wireless frequency band, such as the 2.4 GHz wireless frequency band.

At step S120, the wireless management module 32 monitors a connectivity of the client device 4 to the network. For example, the wireless management module 32 monitors the connectivity to determine additional wireless frequency bands that are accessible by the client device 4, for example, when the client device 4 comes within range of the access point device 4. For example, with reference to FIG. 4, the wireless management module 32 will monitor connectivity of the client device 4A such that the wireless management module 32 will detect the 2.4 GHz wireless frequency band at a first location 403 and then detect the 5 GHz wireless frequency band at a second location 405. In one or more embodiments, the monitoring the connectivity at step S120, is based on a wireless switching setting of the one or more device settings 310. For example, the wireless management module 32 will monitor connectivity when the wireless switching setting is enabled or switching to a different wireless frequency band is permitted.

At step S130, the wireless management module 32 determines the wireless frequency capability associated with the client device 4. For example, the wireless management module 32 can determine the wireless frequency capability based, at least in part, on one or more device settings 310, one or more hardware settings, a manufacturer setting, one or more drivers, one or more applications, one or more other settings, or any combination thereof. For example, one or more client devices 4 may only support a single wireless frequency band (such as the 2.4 GHz wireless frequency band) while other one or more client devices 4 may support a plurality of wireless frequency bands (such as the 2.4 GHz wireless frequency band and the 5 GHz wireless frequency band). In one or more embodiments, the wireless management module 32 sends a request to a repository, for example, hosted at an access point device 2 and/or any other network resource for information associated with the wireless frequency bands supported by the client device 4. The wireless management module 32 receives the information from the repository, information indicative of one or more wireless frequency bands supported by the client device 4. The information can, for example, include client device 4 fingerprint data or any other data associated with client device 4. This information can then be used at step S130 to determine the wireless frequency capability associated with the client device.

At step S140, the wireless management module 32 determines that the client device 4 supports a second wireless frequency band that operates at a higher frequency than the first wireless frequency band based, at least in part, on the wireless frequency band capability. For example, at step S110 it can be determined that the initial wireless frequency band used by the client device 4 to connect to the network is the 2.4 GHz band. At step S130, it can be determined that the wireless frequency capability associated with the client device 4 is at least the 5 GHz wireless frequency band. Thus, at step S140, it can be determined that the client device 4 supports switching to a higher wireless frequency band, such as the 5 GHz wireless frequency band.

At step S150, the wireless management module 32 switches the client device 4 from the first or initial wireless frequency band to the second wireless frequency band based, at least in part, on the determination that the second wireless frequency band is supported by the client device 4. For example, the second wireless frequency band can provide better network performance or QoE for the user as the second wireless frequency band comprises more channels than the first wireless frequency band. In one or more embodiments, the step S140 determines that the client device supports one or more wireless frequency bands.

At step S150, the switching to the second wireless frequency band can be based, at least in part, on a wireless signal strength of any one or more of the one or more wireless frequency bands (such as the first wireless frequency band and the second wireless frequency band) from step S140. For example, at step S150, the wireless management module 32 can select the second wireless frequency from the one or more wireless frequency bands supported by the client device 4 based on a wireless signal strength of the second wireless frequency band. In one or more embodiments, after switching to the second wireless frequency band, the wireless management module 32 can determine that the first signal strength associated with the first wireless frequency band is stronger than the second signal strength associated with the second wireless frequency band, for example, that a difference or ratio of the first signal strength and the second signal strength reaches or exceeds a threshold. The wireless management module 32 can switch the client device 4 back to the first wireless frequency band. In one or more embodiments, the wireless management module 32 can determine to switch the client device 4 to a different wireless frequency band of one or more supported wireless frequency bands based, at least in part, on a signal strength of the different wireless frequency band, a range of the different wireless frequency band, or both.

The wireless management module 32 can switch to the different or the second wireless frequency band or any other wireless frequency band as discussed in reference to FIGS. 1-5. In one or more embodiments, the wireless management module 32 automatically switches the client device 4 to the second wireless frequency band or any other wireless frequency band based, at least in part, on one or more device settings 310. In one or more embodiments, the wireless management module 32 sends a prompt to the user of the client device 4 as discussed with reference to FIG. 5 prior to switching to from a current wireless frequency band to a different wireless frequency band.

According to some example embodiments of inventive concepts disclosed herein, there are provided novel solutions for a wireless management module to perform switching the network connectivity of a network device from a first wireless frequency band to a second wireless frequency band that operates at a higher frequency than the first wireless frequency band. In addition, there is provided an automatic switching of connectivity based, at least in part, on one or more device settings. Further, the wireless management module can scan the network to determine other network devices that would benefit from switching to a higher wireless frequency band. The novel solutions according to example embodiments of inventive concepts disclosed herein provide features that enhance the network environment of, for example, a home/residential network gateway (GW), wireless access points (Wi-Fi APs), Home Network Controller (HNC), wireless routers, mesh networking nodes (e.g., Wi-Fi EasyMesh systems), and the like, by providing switching to a higher wireless frequency band.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What we claim is:

1. A wireless management method of a client device for managing connectivity of the client device to a network, the method comprising:
   determining a first wireless frequency band used by the client device to connect to the network;
   determining a wireless frequency capability associated with the client device;
   determining that the client device supports a second wireless frequency band that operates at a higher frequency than the first wireless frequency band based, at least in part, on the wireless frequency capability;
   scanning the network for network connectivity information associated with one or more network devices;
   sending a prompt to a user interface of at least one of the one or more network devices requesting approval to switch the at least one of the one or more network devices from a currently selected wireless frequency band to a different wireless frequency band that operates at a higher frequency than the first wireless frequency band based, at least in part, on the network connectivity information, wherein the prompt notifies a user of the different wireless frequency band; and
   switching the client device from the first wireless frequency band to the second wireless frequency band based, at least in part, on the determination that the second wireless frequency band is supported by the client device and the approval, and wherein switching the client device from the initial wireless frequency band to the new wireless frequency band comprises:
      disconnecting the client device from the network; and
      reconnecting the client device to the network using the second wireless frequency band.

2. The wireless management method of claim 1, wherein:
   the disconnecting the client device comprises disabling Internet access of the client device; and
   the reconnecting the client device comprises enabling Internet access of the client device.

3. The wireless management method of claim 1, further comprising:
   monitoring a connectivity of the client device to the network.

4. The wireless management method of claim 3, further comprising:
   determining that a wireless switching setting is enabled; and
   wherein the monitoring the connectivity is based, at least in part, on the wireless switching setting.

5. The wireless management method of claim 1, wherein:
   receiving information associated with the client device from a repository, wherein the information is indicative of one or more wireless frequency bands supported by the client device; and
   switching the client device to a different wireless frequency band of the one or more wireless frequency bands based, at least in part, on a wireless signal strength of the different wireless frequency band.

6. The wireless management method of claim 1, further comprising:
   sending a prompt to a user interface of the client device requesting approval to switch the client device from the first wireless frequency band to the second wireless frequency band.

7. A wireless management module for managing connectivity of the client device to a network, comprising:
   one or more instructions stored in a non-transitory computer-readable medium of a client device, the one or more instructions, when executed by a processor of the client device, cause the wireless management module to perform one or more operations to:
   determine a first wireless frequency band used by the client device to connect to the network;
   determine a wireless frequency capability associated with the client device;
   determine that the client device supports a second wireless frequency band that operates at a higher frequency than the first wireless frequency band based, at least in part, on the wireless frequency capability;
   scan the network for network connectivity information associated with one or more network devices;
   send a prompt to a user interface of at least one of the one or more network devices requesting approval to switch the at least one of the one or more network devices from a currently selected wireless frequency band to a different wireless frequency band that operates at a higher frequency than the first wireless frequency band based, at least in part, on the network connectivity information, wherein the prompt notifies a user of the different wireless frequency band; and
   switch the client device from the first wireless frequency band to the second wireless frequency band based, at least in part, on the determination that the second wireless frequency band is supported by the client device and the approval, and wherein switching the client device from the initial wireless frequency band to the new wireless frequency band comprises:
      disconnecting the client device from the network; and
      reconnecting the client device to the network using the new wireless frequency band.

8. The wireless management module of claim 7, wherein:
   the disconnecting the client device comprises disabling Internet access of the client device; and
   the reconnecting the client device comprises enabling Internet access of the client device.

9. The wireless management module of claim 7, wherein the one or more instructions when further executed by the processor of the client device, cause the wireless management module to perform one or more further operations to:
   monitor a connectivity of the client device to the network.

10. The wireless management module of claim 9, wherein the one or more instructions when further executed by the processor of the client device, cause the wireless management module to perform one or more further operations to:
 determine that a wireless switching setting is enabled; and
 wherein the monitoring the connectivity is based, at least in part, on the wireless switching setting.

11. The wireless management module of claim 7, wherein the one or more instructions when further executed by the processor of the client device, cause the wireless management module to perform one or more further operations to:
 receive information associated with the client device from a repository, wherein the information is indicative of one or more wireless frequency bands supported by the client device; and
 switch to a different wireless frequency band of the one or more wireless frequency bands based, at least in part, on a wireless signal strength of the different wireless frequency band.

12. The wireless management module of claim 7, wherein the one or more instructions when further executed by the processor of the client device, cause the wireless management module to perform one or more further operations to:
 send a prompt to a user interface of the client device requesting approval to switch the client device from the first wireless frequency band to the second wireless frequency band.

13. A program comprising one or more instructions stored on a non-transitory computer-readable medium, the program for managing connectivity of a client device to a network, which when executed by a processor of the client device, causes the client device to perform one or more operations comprising:
 determining a first wireless frequency band used by the client device to connect to the network;
 determining a wireless frequency capability associated with the client device;
 determining that the client device supports a second wireless frequency band that operates at a higher frequency than the first wireless frequency band based, at least in part, on the wireless frequency capability;
 scanning the network for network connectivity information associated with one or more network devices;
 sending a prompt to a user interface of at least one of the one or more network devices requesting approval to switch the at least one of the one or more network devices from a currently selected wireless frequency band to a different wireless frequency band that operates at a higher frequency than the first wireless frequency band based, at least in part, on the network connectivity information, wherein the prompt notifies a user of the different wireless frequency band; and
 switching the client device from the first wireless frequency band to the second wireless frequency band based, at least in part, on the determination that the second wireless frequency band is supported by the client device and the approval, and wherein switching the client device from the initial wireless frequency band to the new wireless frequency band comprises:
  disconnecting the client device from the network; and
  reconnecting the client device to the network using the new wireless frequency band.

14. The program of claim 13, wherein:
 the disconnecting the client device comprises disabling Internet access of the client device; and
 the reconnecting the client device comprises enabling Internet access of the client device.

15. The program of claim 13, wherein the one or more instructions when executed by the process further cause the client device to perform one or more further operations comprising:
 determining that a wireless switching setting is enabled; and
 monitoring a connectivity of the client device to the network based, at least in part, on the wireless switching setting.

16. The program of claim 13, wherein the one or more instructions when executed by the process further cause the client device to perform one or more further operations comprising:
 receiving information associated with the client device from a repository, wherein the information is indicative of one or more wireless frequency bands supported by the client device; and
 switching the client device to a different wireless frequency band of the one or more wireless frequency bands based, at least in part, on a wireless signal strength of the different wireless frequency band.

17. The program of claim 13, wherein the one or more instructions when executed by the process further cause the client device to perform one or more further operations comprising:
 sending a prompt to a user interface of the client device requesting approval to switch the client device from the first wireless frequency band to the second wireless frequency band.

18. The wireless management method of claim 1, wherein the network connectivity information is received from an access point device.

19. The wireless management module of claim 7, wherein the network connectivity information is received from an access point device.

20. The program of claim 13, wherein the network connectivity information is received from an access point device.

* * * * *